(12) United States Patent
Nelson

(10) Patent No.: US 6,691,229 B1
(45) Date of Patent: Feb. 10, 2004

(54) METHOD AND APPARATUS FOR RENDERING UNAUTHORIZED COPIES OF DIGITAL CONTENT TRACEABLE TO AUTHORIZED COPIES

(75) Inventor: Terence J. Nelson, New Providence, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/519,253

(22) Filed: Mar. 6, 2000

(51) Int. Cl.[7] .................................. G06F 1/26
(52) U.S. Cl. .................. 713/193; 713/168; 713/200; 713/201
(58) Field of Search ................ 713/193, 168, 713/200, 201

(56) References Cited

U.S. PATENT DOCUMENTS

| | | |
|---|---|---|
| 4,595,950 A | 6/1986 | Lofberg |
| 5,809,160 A | 9/1998 | Powell et al. |

Primary Examiner—Thomas R. Peeso
(74) Attorney, Agent, or Firm—RatnerPrestia

(57) ABSTRACT

A method for customizing a copyrighted digital work that is distributed in multiple data objects on, for example, a writable media, such as an optical disc, or across a global network, such as the Internet, so that an unauthorized second-generation copy can be traced to the licensee. Bits of the license-enforcement data are embedded in a licensed copy by choosing one of two previously prepared versions of each data object. These two versions both have the effect that the artist intended. The licensor can read the enforcement data more easily when digital fingerprints of the application data are carried along with the data objects. In order to remove the enforcement data with a degree of reliability, it would be necessary to introduce subtle changes in the application data and then recompute the fingerprints. This may constitute willful infringement rather than just careless copying. To discourage such determined piracy, the fingerprints are computed using a one-way hash function and encrypted using a public-key encryption algorithm. Public notice is given of the selected one-way hash function and public-key cryptography algorithm along with the value of the public key in use. Consequently anyone can authenticate a copy of the work, and persons who traffic in pirate copies can therefore be held accountable. Certain weaknesses of the method are overcome by concatenating the fingerprints before encryption and overwriting the fingerprints from the same bit positions after encryption.

29 Claims, 13 Drawing Sheets data selection.pdq

Cpr_mai.cdr data selection.pdq orderdb.cdr wsubc.pdq discovery e1.pdq notify.pdq

| | | 100 |
|---|---|---|
| 101 | Address of Notification | |
| 102 | Title of Work | |
| 103 | Sequence Number SN | |
| 104 | Hash Algorithm HID | |
| 105 | Public-Key Algorithm EID | |
| 106 | Public Key PBK | |

Fig. 10 notification authencrypt.pdq authdecrypt.pdq

METHOD AND APPARATUS FOR RENDERING UNAUTHORIZED COPIES OF DIGITAL CONTENT TRACEABLE TO AUTHORIZED COPIES

FIELD OF THE INVENTION

The present invention is directed to preparing traceable copies of digital content and, in particular, to adding a unique identifier to the digitally encoded content in a manner which does not alter the intended effect of the content when the content is played back but which can be readily decoded to determine the source of a copy of the digital content.

BACKGROUND OF THE INVENTION

The present invention relates to a problem that confronts digital audio and video-content providers when such content and/or other copyrightable material is digitally encoded and distributed, for example over a network or via writable storage media: copies of this material are indistinguishable from the original digital content. At the same time, home computers have become common, if not ubiquitous, and distribution methods such as network connections (e.g. the Internet) and peripheral drives that can transfer information to writable media are increasingly affordable. Naturally, these distribution methods can also receive the digital content from others who are connected to the network or from read-only media, so even a nominally honest user can be tempted to make unauthorized copies. This scenario is now affecting the digital audio market because CD-R (write-once) discs have become very inexpensive.

Presently, video DVD content is disguised by the Contents Scramble System (CSS). (For an overview of CSS, see Michael Moradzadeh "Licensing Requirements for the CSS DVD Copy Protection Method," Intel Corporation, 1997.) Unscrambled digital video outputs are not provided on consumer-market players, and current DVD-ROM drives that play video DVD discs output scrambled content to a separate hardware decoder. A hardware decoder represents extra cost, but software implementations are also possible and have even been licensed. Cheap unlicensed CSS decoder software, has already appeared on a website as freeware. Such software could give any personal-computer user, even one who lacks specialized knowledge, full access to the content on video DVD discs. At the present time, writable DVD discs are not widely available at the full capacity (4.7 Gbytes) of video DVD discs, but DVD technologists are working on that, too.

Thus it appears that the rapid pace of technology may stunt the growth of the video DVD market within a few years of creating it. It is not surprising that a DVD application that used strong encryption (called DIVX) appeared (see "Digital Versatile Delirium: DIVX vs. DVD-Video," InterActivity Magazine, Oct. 1998.) The DIVX system was meant to free consumers from the danger of incurring late charges on rented discs. In fact, DIVX discs were not returnable. Initially they could be played for only 48 hours. After that 48-hour period elapsed, the disc could be made to be played again, but with additional charges. Billing and access to encryption keys were managed from a central location through telephone lines connected to each player. However most existing DVD players do not have the strong-decryption circuitry and telephone interfaces necessary to receive authorization and play DIVX discs. Some consumers postponed purchasing either type of player for a while, thinking regular DVD players might become obsolete. Meanwhile DIVX players are a market failure. Although it is likely that the cost of the extra circuitry in the DIVX players would have decreased over time, consumers apparently did not want to keep discs that can cause unexpected charges to appear on their credit-card statements, or require phone authorization at all.

The security of DIVX is also questionable. It is difficult to devise a copy-protection scheme for identical mass-market discs relying exclusively on information contained on the discs themselves. This is because personal computers are more powerful than players. Attempts to put functions into a player that cannot be duplicated in software in a personal computer have been overtaken by advancing technology. Also, DIVX discs become unusable in DIVX players when the players can no longer make telephone connections to DIVX service centers.

Clearly, the problem of copy protection remains unsolved, and there is still time to consider new approaches. One aspect of the problem that appears to have been overlooked is that, when consumers can afford to use writable media for copying, the opportunity arises for content providers to use the same writable media for distribution. At that time, a content provider will also have an opportunity to customize the content for the intended customer. This customization might add value for the paying customer while subtracting value for other persons who have different needs and preferences. Indeed, mass customization may well turn out to be a new paradigm for many industries in the $21^{st}$ century (see Rosemary Coates, "Mass Customization—Manufacturing Postponement for the Next Century," Computer Sciences Corporation White Paper, 1997).

A prior-art method of customizing content introduces information identifying the recipient as described in U.S. Pat. No. 4,595,950 entitled METHOD AND APPARATUS FOR MARKING THE INFORMATION CONTENT OF AN INFORMATION CARRYING SIGNAL. Here, the content on the distribution media is not usefully customized, but it is encoded. The assumption is made that the recipient cannot access the content other than through a decoder that adds information identifying the recipient. Subsequent copies of the playable content are thus traceable, and thereby protection against such copying is obtained. One disadvantage inherent in this method is that the installed base of encoders provides an upper limit to the market for content and vice versa.

There is voluminous prior art for embedding a message in a digital work. For example, U.S. Pat. No. 5,809,160 "METHOD FOR ENCODING AUXILIARY DATA WITHIN A SOURCE SIGNAL," is directed to the problem of identifying candidate points in an image at which data can be unobtrusively embedded through subtle modifications of pixel values. This method is conditioned on identifying the presence of signature points in an image. It is therefore necessary to analyze a subject image in order to retrieve data that may be hidden therein. However, digital works are typically stored or transported in large numbers of data objects that are substantially smaller than is required to represent a complete image. It is more convenient to detect hidden data directly from these small data objects rather than to assemble many of them into an image and then extract the data by image processing techniques. Moreover, some digital works may not represent images or analog signals of any kind.

SUMMARY OF THE INVENTION

The present invention is embodied in a method and apparatus for preparing a digital work in sequential default data objects for subsequent customization of two or more distinct copies. By this method, digitally distinct alternate versions of each data object of the digital work are prepared such that each alternate version of each data object is judged to produce an acceptable variation in said digital work. The various objects are then saved in a content database.

According to another aspect of the invention, a method of encoding the digital work to identify a particular copy further begins by preparing enforcement data for each customized copy sufficient to trace the copy to a customer to whom the copy is going to be distributed. The enforcement data with customer identification information is then recorded. The customized copy is assembled by selecting successive data objects in the work as either the data object or one of the alternate data objects from said content database depending on successive values of the enforcement data.

According to another aspect of the invention, the identification data for a particular copy may be reconstructed by discriminating between said default data object and said alternate data object, using the content database, as the successive data objects of said copy are processed. The enforcement data object is reconstructed by assigning values in successive positions responsive to the discrimination. Once the enforcement data object is obtained, the associated identification information for the customer is recovered from the database.

According to yet another aspect of the invention, the identification of the enforcement data object may be made from less than the full object. This aspect of the invention starts by selecting a one-way hash function that is used to compute digital fingerprints of the default and alternate application data in each data object, the fingerprints containing at least one bit but fewer bits than the application data. This aspect of the invention continues by storing the fingerprint data in the copyright management area of each data object, wherein, for each data object, the fingerprint data differs in at least one bit position from the fingerprint data of the alternate application data object. In this embodiment, the fingerprint data of the copy is compared to fields of the database.

According to another aspect of the invention, a method for authenticating copies of a digital work is provided. The method begins by accessing authentication information to obtain an authentication object. The encrypted fingerprint data is then concatenated to the authentication object. At the receiving end, the authentication data is decrypted using decryption data available to the recipient. The decrypted authentication data is then parsed into decrypted fingerprint data which are matched to the fingerprint data of the digital copy. The copy is determined to be authentic when the fingerprint data in the database matches the decrypted fingerprint data.

BRIEF DESCRIPTION OF THE DRAWINGS

FIG. 10 is a data diagram that illustrates the information that a content distributor would publish to enable authentication of customized copies of a digital work.

DETAILED DESCRIPTION OF THE INVENTION

Figure 1:
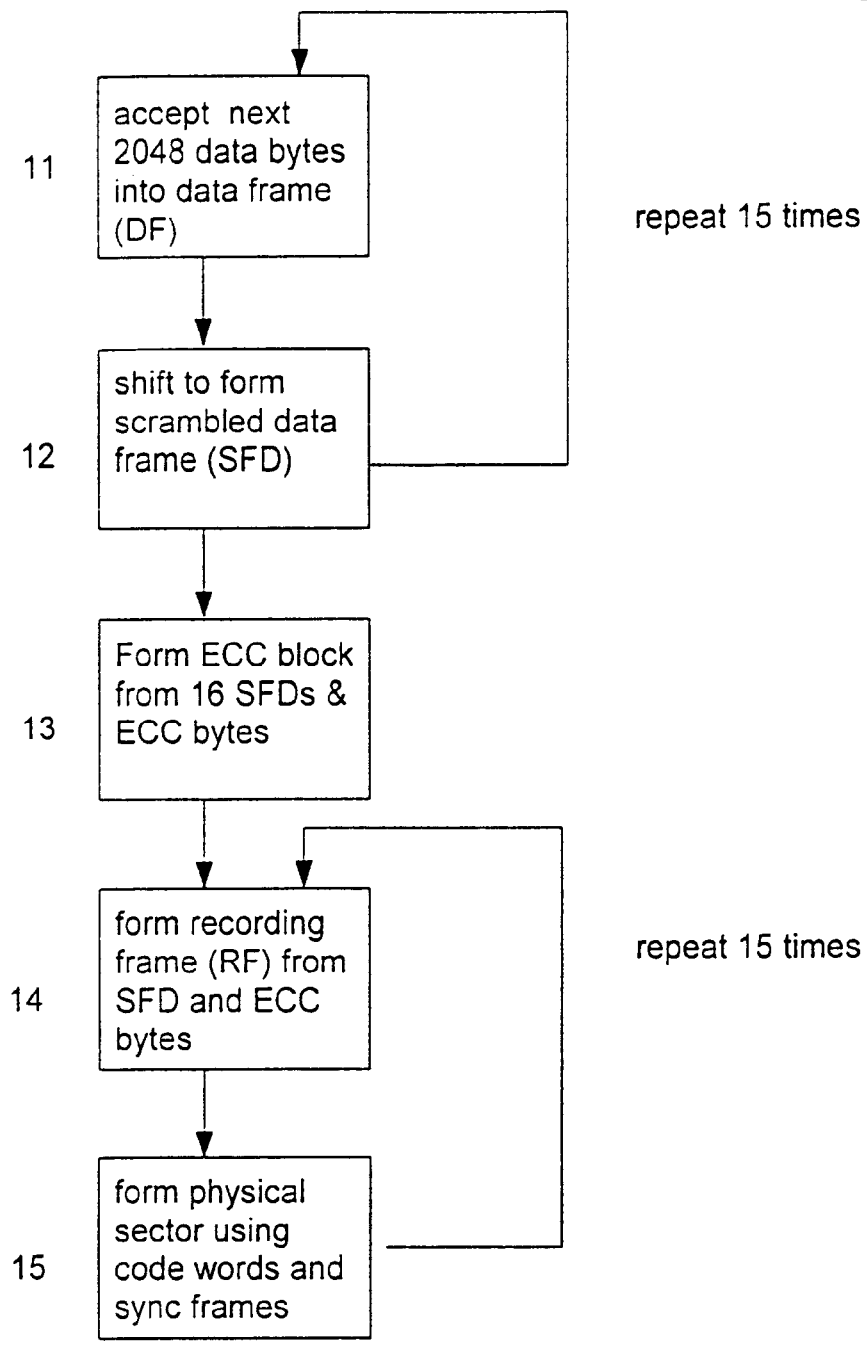
FIG. 1 is a flow-chart diagram that illustrates the method by which data for an application is formatted into physical sectors of a DVD-ROM.

The organization and operation of this invention will be understood from a consideration of detailed descriptions of illustrative embodiments, which follow, when taken in conjunction with the accompanying drawings.

One advantage of the present invention is that it allows the customizing of digital works delivered in sequential data objects so that unauthorized exact copies can be traced to the person who accepted the original.

Another advantage of the invention is that it separates the steps of preparing alternate data objects from the steps of customizing a digital work for particular customers. In particular, it is advantageous to prepare alternate data objects at the time when a digital work is created so that the acceptability of both versions can verified by the artist.

Another advantage of the invention is that it allows the detection of copies which are not exact copies of a customized digital work. This makes it possible to hold intermediaries responsible when they distribute willfully infringing copies of copyrighted digital works.

Yet another advantage of the invention is that it provides copy protection without affecting the content so that the copy can be used in legacy drives and players now and also in the future after the copyright has elapsed.

Digital works delivered on read-only optical discs are typically divided up into large numbers of data objects of around 2 to 2.5 kbytes each. When a copyrighted digital work is transferred to a writable optical disc, there is an opportunity to introduce subtle changes that do not invalidate the work but do represent added information. For example to change the value of the least significant bit in one byte of a multi-byte segment. Normally, one thinks of this transfer as occurring after the delivery of the copyrighted work on a read-only optical disc. At that stage, however, it is difficult for technical and business reasons to introduce information that would help enforce the copyright.

Digital works delivered over a network are typically sent in packets. For example, digital audio files encoded according to the Moving Picture Experts Group (MPEG), Audio Level 3 (MP3) are formatted into variable-length program elementary stream (PES) packets prior to transmission. Although the invention is described below with reference to data objects stored on a writable medium, it is contemplated that it may be practiced on packetized information transmitted over a network.

Using the present invention, a copyright holder or agent may control the writing process and can choose to encode license enforcement information, such as the identity of the licensee, into each copy. This encoding is performed by choosing one of two data objects according to the bits of the enforcement data object. For this method to be most effective, it is desirable that the customers be informed in advance that the copies they get are traceable. The two choices for each data object may be prepared during the creation of the digital work, when it is relatively easy to ensure that they are equally valid from an artistic standpoint.

A distributor of the digital work keeps a record of each transaction, along with the actual enforcement data, in a database. Then, when an unauthorized copy of that digital work is discovered, the distributor can read the enforcement data from the copy by determining and recording which of the two variations of each data object are present in the unauthorized copy. The enforcement data is then used to identify the transaction in which the work was distributed and, as a result, the source of the unauthorized copy. Having identified the source of the unauthorized copy, the distributor can seek whatever remedy is appropriate. Knowing that they could be held responsible in this manner, nominally honest end users may be more careful in their use of the digital copy.

When tracing an unauthorized copy of a digital work, it is not necessary to examine every bit in order to discriminate between two possible data objects. The comparison of data objects is accelerated in a second embodiment by the use of one-way hash functions. Matching these hash values, also called fingerprints, is faster than matching each data object bit-by-bit, as the fingerprints are shorter than the data objects they represent. The comparison of as little as one bit of the hash value would be sufficient to identify the data object, provided the creator of the digital work ensures that the hash bit is not the same for the two possibilities. Although the enforcement data could still be effaced by making subtle changes in the application data and recomputing the fingerprints, this represents an escalation from merely copying to actually tampering with the digital work, and nominally honest users may hesitate to do it.

A third embodiment operates on a customized copy of a digital work assembled according to the second embodiment. This copy is made authenticatable using, for example, public-key cryptography. The application data is not encrypted, so authenticatable customized copies can be read in conventional drives and will play in legacy players. Only the fingerprints are encrypted using a private key that is known only to the distributor. The fingerprints can be decrypted by anyone using a public key that the distributor publishes along with information identifying the one-way hash function and the public-key cryptography algorithm that is being used. Because the private key is needed to encrypt the fingerprints, the encrypted fingerprints cannot be changed. Therefore, having decrypted the fingerprints, anyone can proceed to authenticate the application data using the specified one-way hash function.

The amount of data that may be used for copyright management information is usually strictly limited. Given this restriction, however, it is also possible that a pirate may obtain multiple authenticatable customized copies and remix them to make an untraceable copy that is still authenticatable. Both of these problems are overcome by concatenating the fingerprints before encryption and then overwriting the fingerprints from the same bit positions they occupied before encryption. Then the shortest authentic sequence of data objects that a pirate could use would be the length of the block size used in the public-key algorithm divided by the greatest common divisor of the block size and the length of the fingerprints. One way to make this substitutable unit long is to choose a prime number for the fingerprints and then make sure the block size is not a multiple of it.

Writable media is now available with capacity sufficient to copy digital works originally distributed on read-only media. Nominally honest customers may be tempted to make copies for "temporary" use. While copying the digital work for personal use is not illegal, the distribution of the copies to others is a violation of the law. Therefore, the present invention does not prevent copying. However, customers may be enticed to distribute copies to their friends. Their friends may then pass along third-generation copies and so on until the license of the original copy of the digital work becomes thoroughly broken. This is a problem that producers and distributors of digital audio (CD) and CD-ROM discs are now confronting. Technologists are also developing writable discs that may be used for copying digital video (DVD) and DVD-ROM discs in the future. The present invention recognizes the ease with which people may distribute illegal copies of copyrighted digital works, and acts as a deterrent to illegal copying.

Recognizing that the writable media has become cheap enough, although possibly still more expensive than the read-only media, content owners can choose to deliver their content in that form. One requirement of course is that the writable media must be readable in the same drives or players designed for the read-only media. Once it is established that writable media may be used for distribution of digital works, content owners will have an opportunity to render each copy unique. When an unauthorized second-generation copy is discovered, a content owner can trace the identity of the customer who received the licensed copy from which the unauthorized copy was made.

The present invention can be used to protect digital works delivered in multiple data objects on CD and DVD discs and other media, as well as other forms of distribution, such as downloading from a network such as the Internet. Examples of such data objects will be explicitly mentioned in connection with the DVD-ROM disc format. A wealth of information about DVD is contained in Jim Taylor's book *DVD Demystified*, McGraw-Hill, New York, 1998. Also, mechanical, physical and optical characteristics of 120 mm, DVD read-only optical discs are specified in ECMA-267, which is a standards document that can be obtained from ECMA at 114 Rue du Rhône, CH-1204, Geneva, Switzerland. The standard also specifies the quality of the recorded signals as well as the format of the data and the recording method in order to assure interchangeability.

FIG. 1 illustrates the main steps of an exemplary embodiment in which application data is formatted before being recorded in physical sectors on a DVD-ROM disc. In the first step (11), 2048 bytes at a time are accepted into data frames (20). In step 12, frames are scrambled using a feedback shift-register circuit. In step 13, 16 scrambled data frames are accepted into an ECC block. Error correcting bytes are then computed to complete the ECC block. An ECC block is then used to fill 16 recording frames at step 14. The bytes in recording frames are transformed into 16-bit code words, and sync frames are added at step 12 to form the bit patterns that are written into physical sectors of a disc. These steps are reversed when data is read back from a disc.

Figure 2:
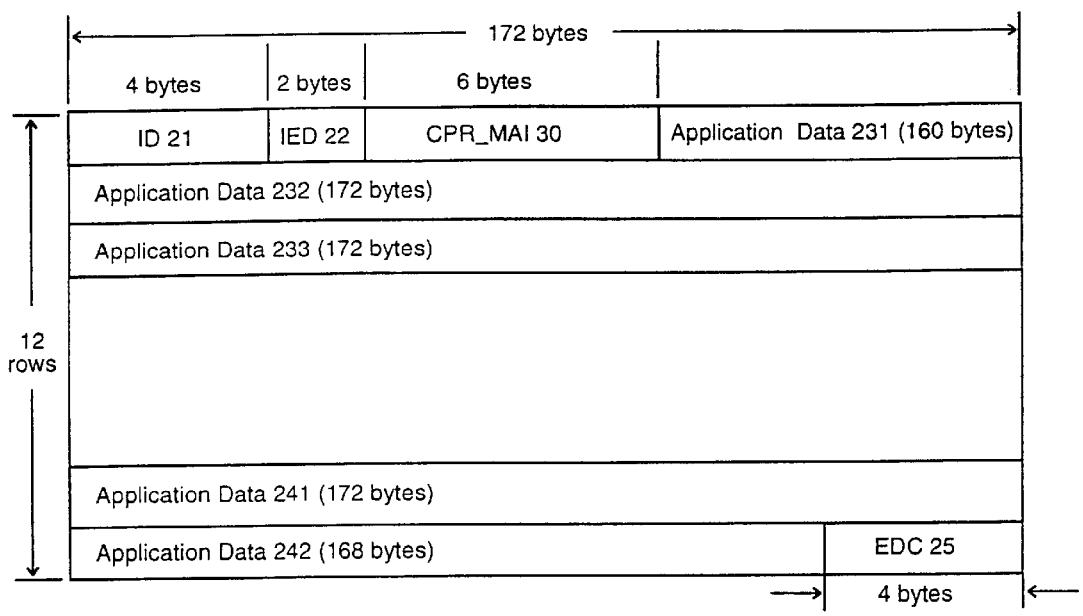
FIG. 2 is a data diagram that illustrates the tabular organization of 2064-byte data frames used in the first step of preparing main data to be recorded in physical sectors.

FIG. 2 illustrates the tabular organization of a data frame (20) into 12 rows of 172 bytes. The first row contains 160 bytes of application data (231), the last row (242) contains 168 bytes, and the middle 10 rows are each filled with 172 bytes. The first row also contains 4 bytes of identification data ID (21), 2 bytes of error detection code IED (22) for the identification data and 6 bytes of copyright management information CPR—MAI (30). The last row also contains 4 bytes of error detection code EDC (25) for the other 2060 bytes in the data frame.

Figure 3:
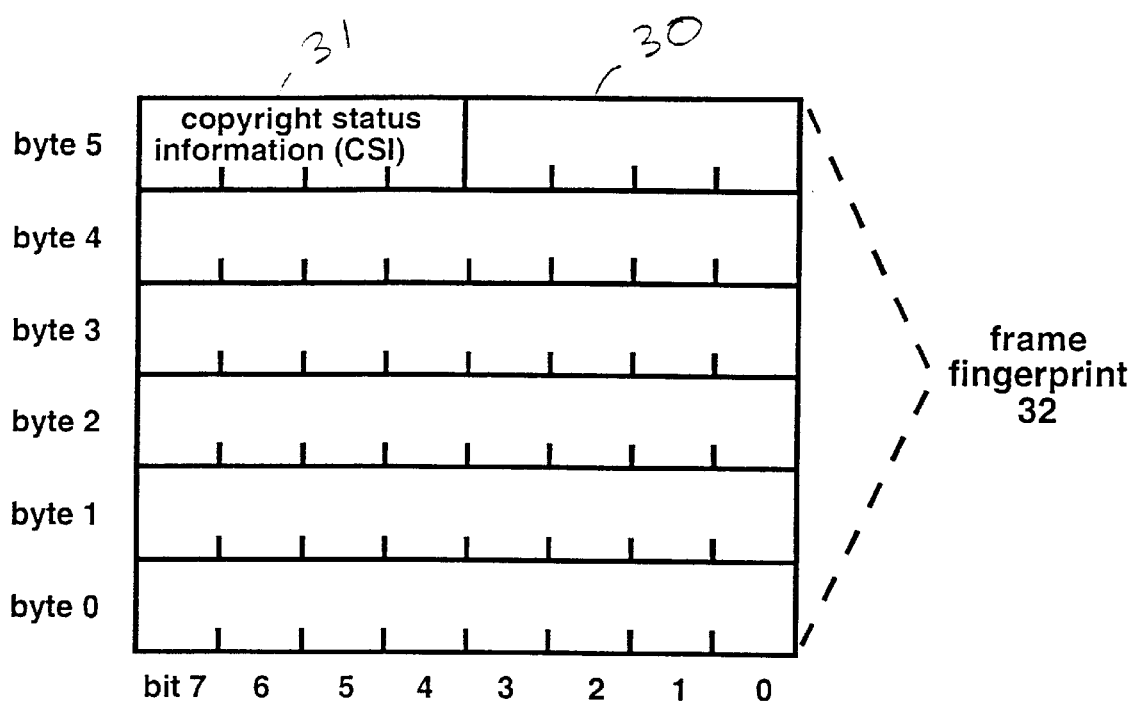
FIG. 3 is a data diagram that shows the allocation of the 6 bytes of copyright management information in each data frame.

FIG. 3 shows a possible allocation of the 6 bytes of copyright management information. Only the 4 most significant bits of byte 5, labeled CSI (31) in FIG. 3, are used for copyright status information. Illustrative code assignments for the 4 bits of CSI are:

Bit 7 = 0; this sector contains no copyrighted material,
       1; this sector contains copyrighted material,
Bit 6 = 0; this sector has no specific data stuucture for copyright protection,
       1; this sector has a specific data structure for copyright protection.
Bits 5&4 = 00; copying is permitted without restriction,
       01; one generation of copies may be made,
       10; copying is permitted but copies will be traceable and distribution is prohibited,
       11; no copying is permitted.

In illustrative embodiments of the invention described below, any of these bit settings can be used. However, the bit setting of 1,0 for bits 5 and 4, respectively, is introduced specifically for these embodiments. This setting indicates that while copying is not restricted, distribution of copies is not permitted by terms of a license that users of the digital work are advised they have agreed to in accepting delivery of the work.

Figure 4:
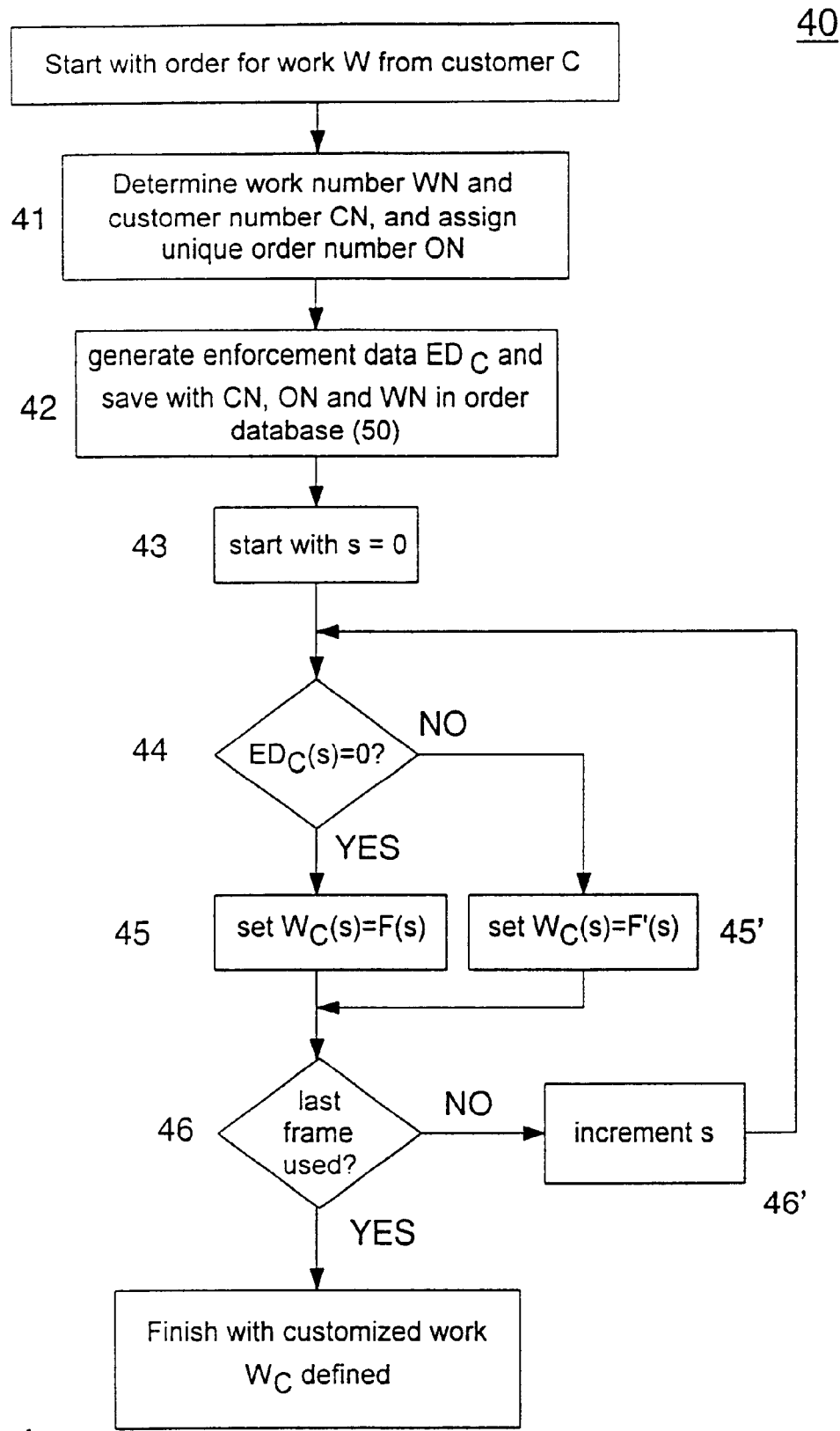
FIG. 4 is a flow-chart diagram that illustrates steps that a content provider can follow to customize an authorized copy on writable media so that subsequent unauthorized copies are traceable.
Figure 5:
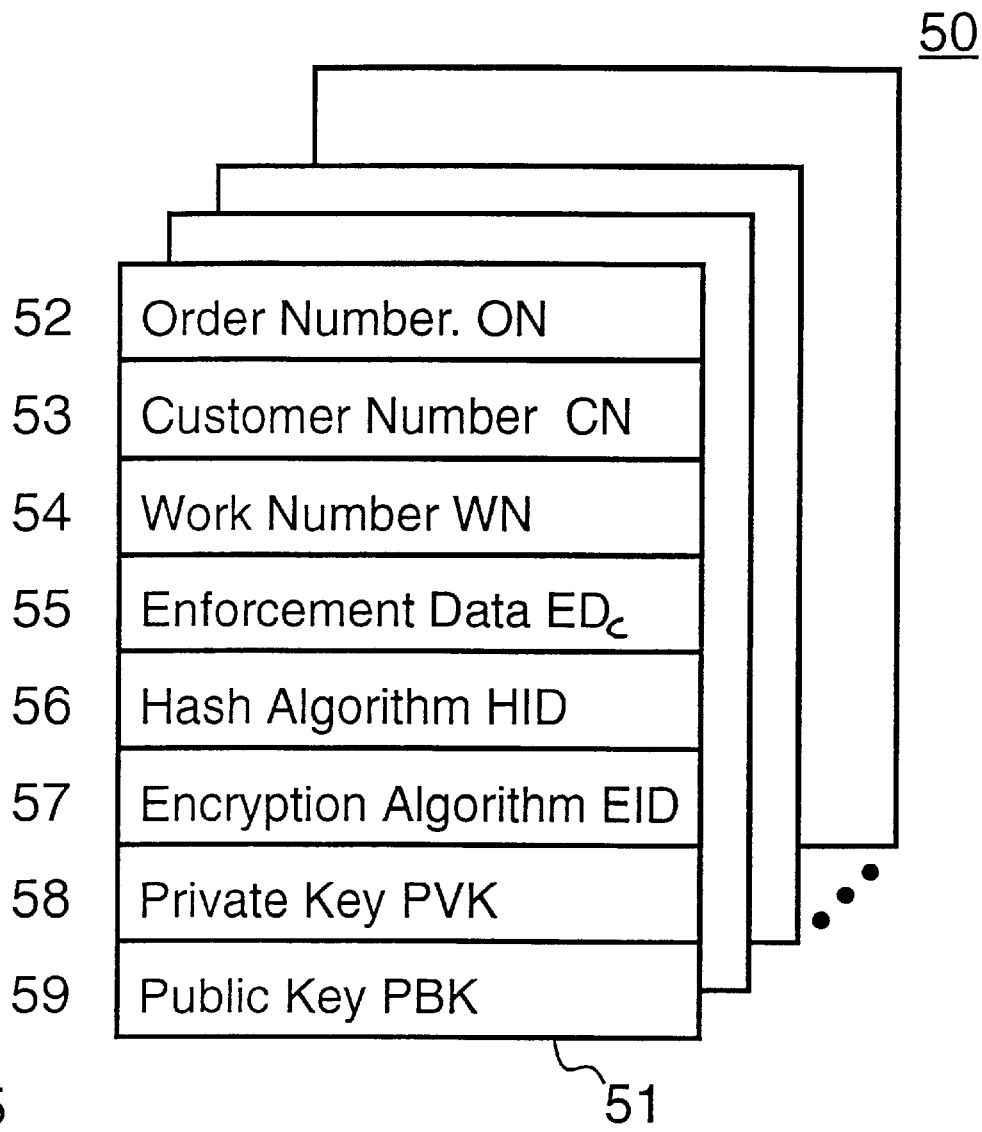
FIG. 5 is a data diagram that illustrates an order database in which a record is created when a customer orders a digital work.

FIG. 4 illustrates the steps that comprise a method (40) for customizing a digital work W for a customer C starting with receipt of an order. At step 41, a work number WN (54) and customer number CN (53) are determined, a unique order number ON (52) is assigned, and this information is entered on a new record in an order database (50) as illustrated in FIG. 5. At step 42, an enforcement data object $ED_C$ (55) is created that contains information that can be used to trace the identify customer C from unauthorized copies. The enforcement data is also saved in the order database.

Figure 6:
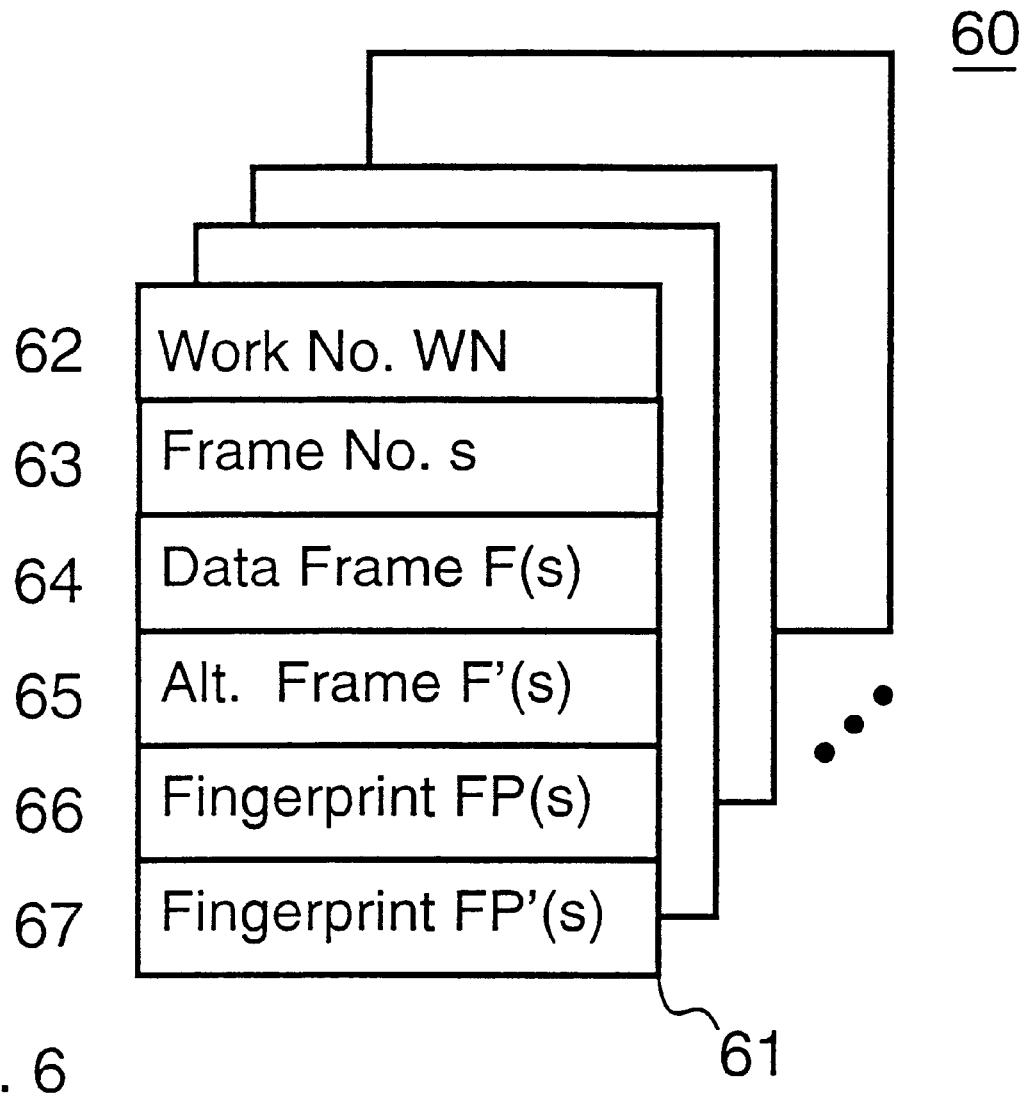
FIG. 6 is a data diagram that illustrates a content database containing default data frames and alternate data frames for each digital work in the database.

FIG. 6 illustrates records 61 in a content database (60). These records have fields for the work number WN (62) and the frame number s (63). These records also contain fields in which both the default frame F(s) (64) and an alternate frame F'(s) (65) are given. An alternate frames F'(s) is created to be distinct from F(s) in at least one bit but artistically equivalent.

Figure 7:
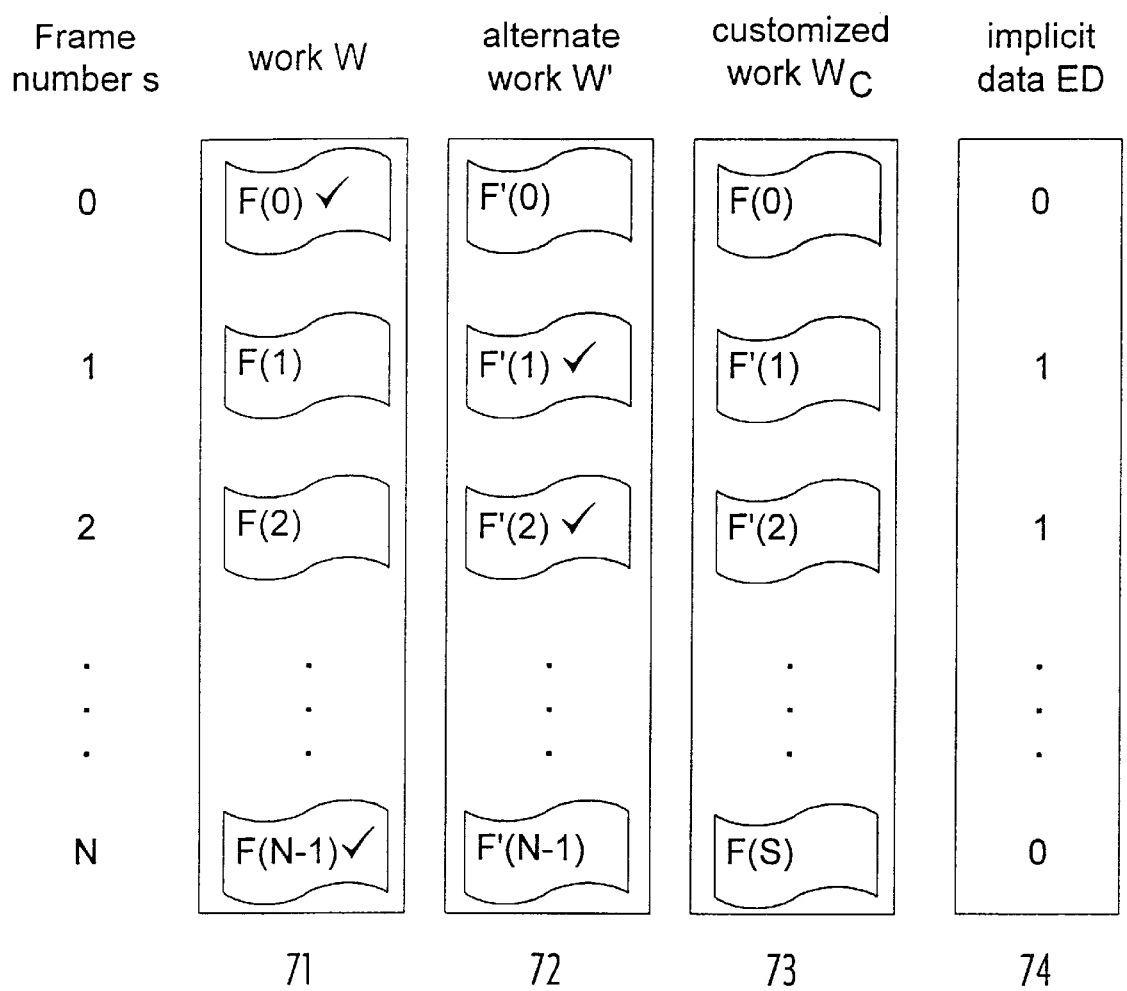
FIG. 7 is a data diagram that illustrates a choice of one of two distinct possibilities for each data frame of a customized digital work.

The set of alternate data frames F'(s) associated with a work W (71) comprise a distinct but equivalent work W'(72) as indicated in FIG. 7. Referring to FIG. 4, at step 43 the frame number s (63) is initialized to 0. At step 44 it is determined if the sth bit of the enforcement data object $ED_C$ (55) is a 0. If it is a 0, the sth frame of the customized work $W_C$ is set equal to F(s) at step 45. Otherwise, the sth data object of the customized work $W_C$ is set equal to F'(s) at step 45'. At step 46 it is determined if the last frame in the digital work has been considered. If there are more frames, the frame number s is incremented at step 46' and processing continues at step 44. If a selection has been made for the last frame, then the customized work $W_C$ is complete. The customized work $W_C$ may then be transferred to writable media, or otherwise delivered to the customer. Thus the customized digital work $W_C$ enc odes the enforcement data object $ED_C$ (55) implicitly in a way that the distributor can read. Knowledge that this reading is possible may make nominally honest users pause before making extra copies.

Figure 8:
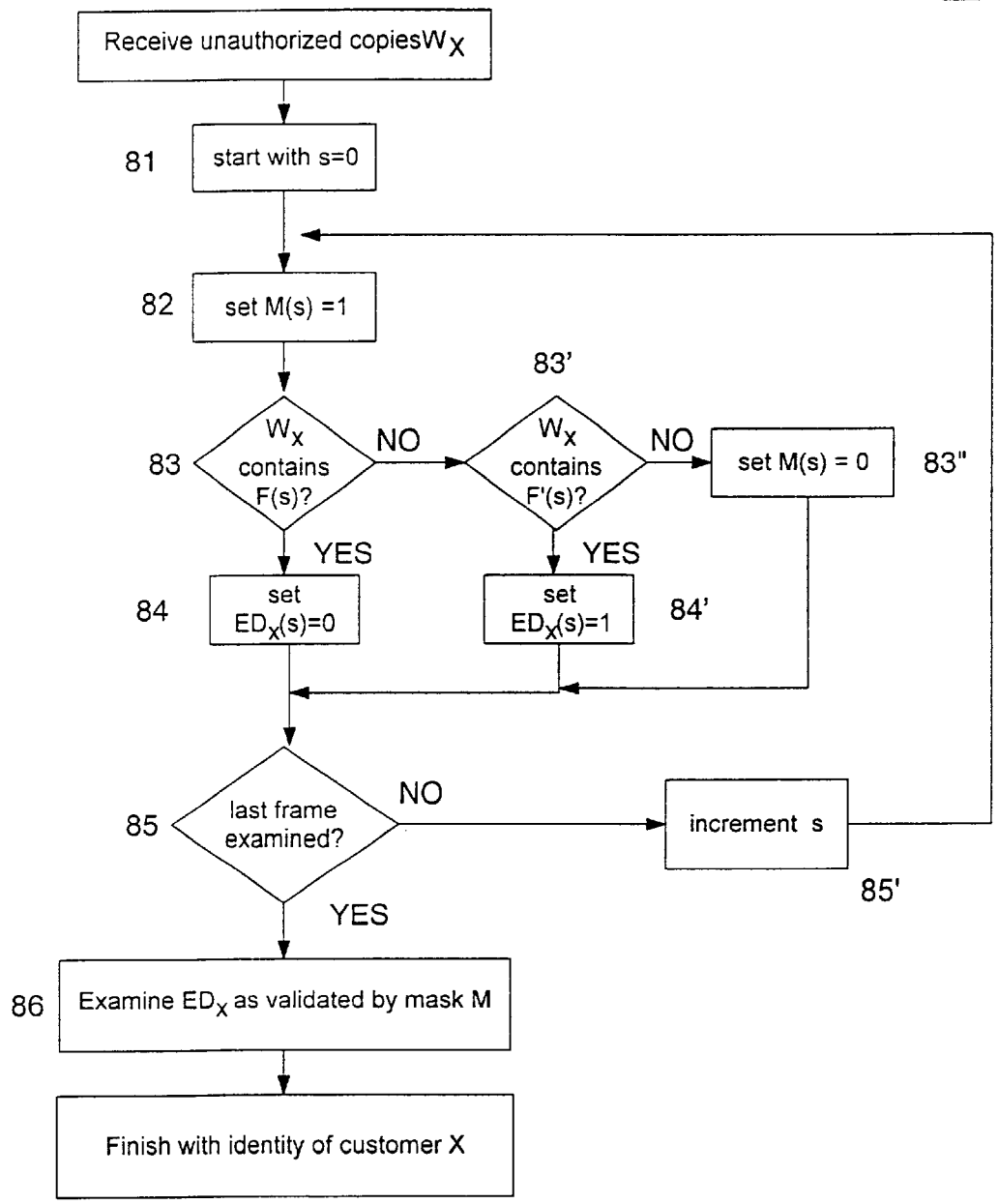
FIG. 8 is a flow-chart diagram that illustrates a method by which a copy of a customized digital work can be traced to the customer who received that copy originally.

If unauthorized copies $W_X$ appear, the owner of the work W can follow the method shown in FIG. 8 to identify the responsible infringing licensee X. The method proceeds by comparing the frames numbered by s (63) present in the copy $W_X$ with the default frames F(s) (64) and alternate frames F'(s) (65) stored in the content database (60). This process is initialized with frame number s=0 at step 81. At step 82, a bit of a mask data object M(s) is set equal to 1, indicating that the corresponding bit in the data object $ED_X(s)$ (55) is assumed to be valid. At steps 83 or 83', it is determined whether F(s) or F'(s) is present, and at steps 84 or 84', the data bit $ED_X(s)$ is set to 0 or 1 accordingly. If neither the default frame F(s) nor the alternate frame F'(s) is present, then at step 83" the mask bit M(s) is reset to 0. At step 85, it is determined if all the frames of the unauthorized copy have been examined. If not, then at step 85' the value of s is incremented and the process continues from step 82 until every frame in $W_X$ has been examined. When $W_X$ has been completely examined, the recovered enforcement data object $ED_X$ is read at step 86. It is read through the mask M, that is, bit positions s for which M(s)=0 are disregarded. Some loss of information can be compensated for by redundant encoding of the licensee X's identity in the enforcement data object $ED_X$. In fact, a great deal of redundancy can be provided if the work is a DVD digital movie. In that case, there can be over 2.1 million data frames for a maximum capacity in the enforcement data object in excess of 0.25 Mbytes.

In the event that a customer disputes the reading of the enforcement data, the distributor can produce evidence of the transaction from the order database.

In order to trace an unauthorized copy $W_X$, it is not always necessary to examine every bit in order to discriminate between default frames F(s) (64) and alternate frames F'(s) (65). This comparison can be accelerated in a second exemplary embodiment with the use of one-way hash functions. One-way hash functions are described in Chapter 18 of the book by Bruce Schneier, *Applied Cryptography, Second Edition*, John Wiley & Sons, Inc., New York, 1996. In general, a hash function transforms a digital data object of arbitrary length into a hash value of fixed length. The security advantages of one-way hash functions derive from three properties. First, the hash function is easily computed, second, it is hard to find a data object that hashes to a predetermined value, and third, it is hard to find a second object that hashes to the same value as some given first one. A one-way hash value is commonly called a fingerprint. This terminology refers to the way impressions left on objects can be traced to establish a person's identity through records of the unique skin configurations on peoples' fingertips.

Referring to FIG. 3, 44 bits of the copyright management information (30) have been assigned to hold a frame fingerprint (32). It is much easier to compare 44-bit fingerprints of data frames than it is to compare the much longer frames directly. As shown in FIG. 6, fields in the content database (60) are provided for the fingerprints FP(s) (66) of default frames and FP'(s) (67) of alternate frames. Then identifying which frame is present in an unauthorized copy, Wx, of a digital work W can advantageously be accomplished by comparing the frame fingerprint (32) in the sth data frame of the unauthorized copy, Wx, with FP(s) at step 83 and FP'(s) at step 83'. A one-way hash function that produces an output longer than the 44-bit fingerprint (32) can be truncated to fit in the space available. On the other hand, it is not necessary to use all 44 bits. The fingerprints can even be shortened to just one bit provided each alternate frame is adjusted until FP(s) differs from FP'(s). Of course, using the shortest possible fingerprints gives the maximum acceleration of the identification process at steps 83–84 and 83'–84' of FIG. 8.

The embodiments of the invention described above provide protection against exact copies. It is assumed that nominally honest users would not make inexact copies in order to escape detection. However, such users might be tempted to do so if inexpensive piracy software becomes readily available. Such piracy software could alter the application data or its fingerprints or both. Altering just the fingerprints is not a good choice because the enforcement data $ED_X$ would still be readable in an unauthorized copy. It would just take longer to extract. Therefore it can be assumed that piracy software will alter the application data and recompute its fingerprints. As a practical matter, however, a person who receives a pirated copy and passes it on to someone else might claim that he or she did not make the copy and did not know it was pirated. Tracing the physical path of a pirated copy back to its original source could be difficult in such circumstances. Therefore a better strategy is to provide a method to detect tampering in particular copies of protected digital works. Then, persons who traffic in such copies can be held accountable if it is possible for them to use the method themselves.

Public-key cryptography provides a solution to this problem. Such algorithms and their applications are described in Chapters 19 and 20 of *Applied Cryptography*. Briefly, knowledge of the algorithm and the public key used enables anyone to decrypt messages that could only have been encrypted with a matching private key. The cryptographic strength depends on the demonstrated unfeasibility of determining the private key by known methods. Therefore, when an algorithm is employed that has survived published attempts at cryptanalysis, one may safely infer that only the party who originally generated the key pair would necessarily know the private key.

Figure 9:
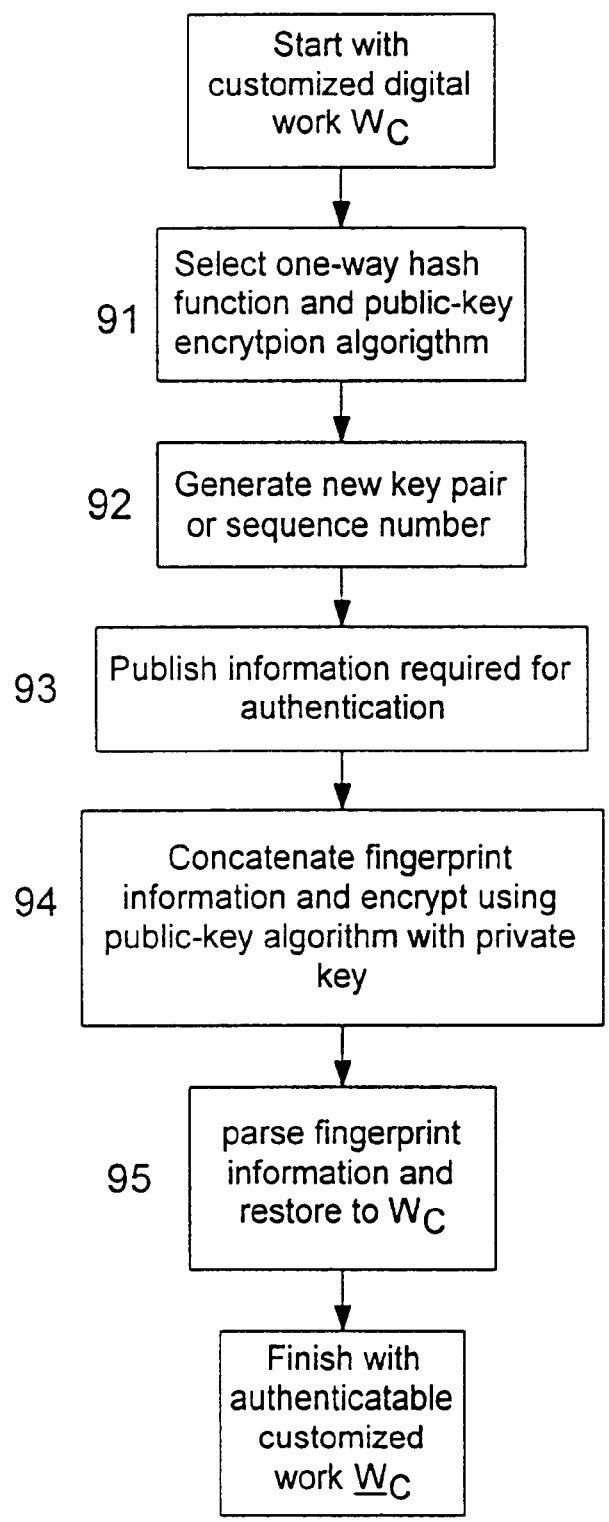
FIG. 9 is a flow-chart diagram that illustrates steps that a content distributor can follow to enable authentication of a customized copy of a digital work.

FIG. 9 shows major steps of a method (90) that a content distributor can follow in a third embodiment to enable authentication of customized copies of digital works. This method starts with a customized copy $W_C$ of a digital work prepared by method 40 as shown in FIG. 4. At step 91, a one-way hash algorithm identified by HID (56) and a public-key encryption algorithm identified by EID (57) are chosen and associated with the unique order number ON (52) in the order database (50). If necessary, at step 92 in the method shown in FIG. 9, a key pair consisting of a private key PVK (58) and public key PBK (59) are generated and saved in the order database (50). Of course, the same key pair might be used for many or even all customized copies of the same digital work. In the latter case, a sequence number SN (103) would be generated by which the pertaining public key PBK (59, 106) can be accessed. At step 93, the information that is necessary to authenticate a customized copy of the digital work is published.

FIG. 10 shows an example of the public notification (100), which might also be included on a warning screen that is shown when the digital work is played. The notification can also be a printed notice that is packaged with the customized copy of the work, and it can also be added to the work as a digital data object that can be accessed by players and personal computers. However, the copy of the information that may be included in the customized work in these various ways is not necessarily authentic, only the published version can be relied on. The public information comprises the address at which such notifications are published (101), the title of the work (102), a sequence number (103), a code HID (56, 104) identifying the one-way hash algorithm used, a code EID (57, 105) identifying the public-key algorithm used, and the public key PBK (59, 106) itself. The notification may contain a range in the sequence-number field (103) in case the same public key was used more than once.

Referring to FIG. 9, at step 94, the fingerprint information from the frames of the customized work $W_C$ is concatenated and encrypted with the public-key algorithm identified by EID (57, 105) using the private key PVK (59). A result of this type is generally called a digital signature. That is, only a person who possessed the private key PVK (58) could have encrypted the fingerprint information, which in turn could only have been made using the one-way hash function with the authentic application data.

Public-key algorithms do such calculations modulo some large integer typically requiring hundreds or even thousands of bits for their expression. In order to encrypt a message that is longer than the modulus, the message is first parsed into submessages each of the length appropriate for the algorithm. When fingerprints have f bits and the modulus of the public-key algorithm has m bits, the boundaries of the fingerprints and the encrypted submessages will align once in every f*m/GCD(f,m) bit positions. Here GCD(p,q) stands for the greatest common divisor of two integer numbers p and q. This is relevant because a pirate copy could be assembled by mixing units of this length from multiple authorized copies. Such a pirate copy could be untraceable if each submessage contains too few bits of the enforcement data $ED_X$ (55) to identify the person X who received the customized copy of the work containing that subunit. Therefore, these subunits should be as long as needed for this purpose, and content distributors should repeat the information identifying the receiver within every subunit. One way to make such subunits as long as possible is to use a prime number for f that is not a divisor of m. Now as shown in FIG. 3, the number of bits available in the copyright management area (20) of DVD-ROM data frames (20) is 44. The next smaller prime number is 43, so this is a convenient number to use along with the condition that the modulus must not be a multiple of it.

If a rather short modulus of 512 bits is used with this fingerprint length, there would be 43*64 bytes in the enforcement data in a subunit. This length would be adequate for identification in most cases. On the other hand, if fewer bits can be used, it is efficient to decrease the number of fingerprint bits because then fewer encryption steps will be needed.

Figure 11:
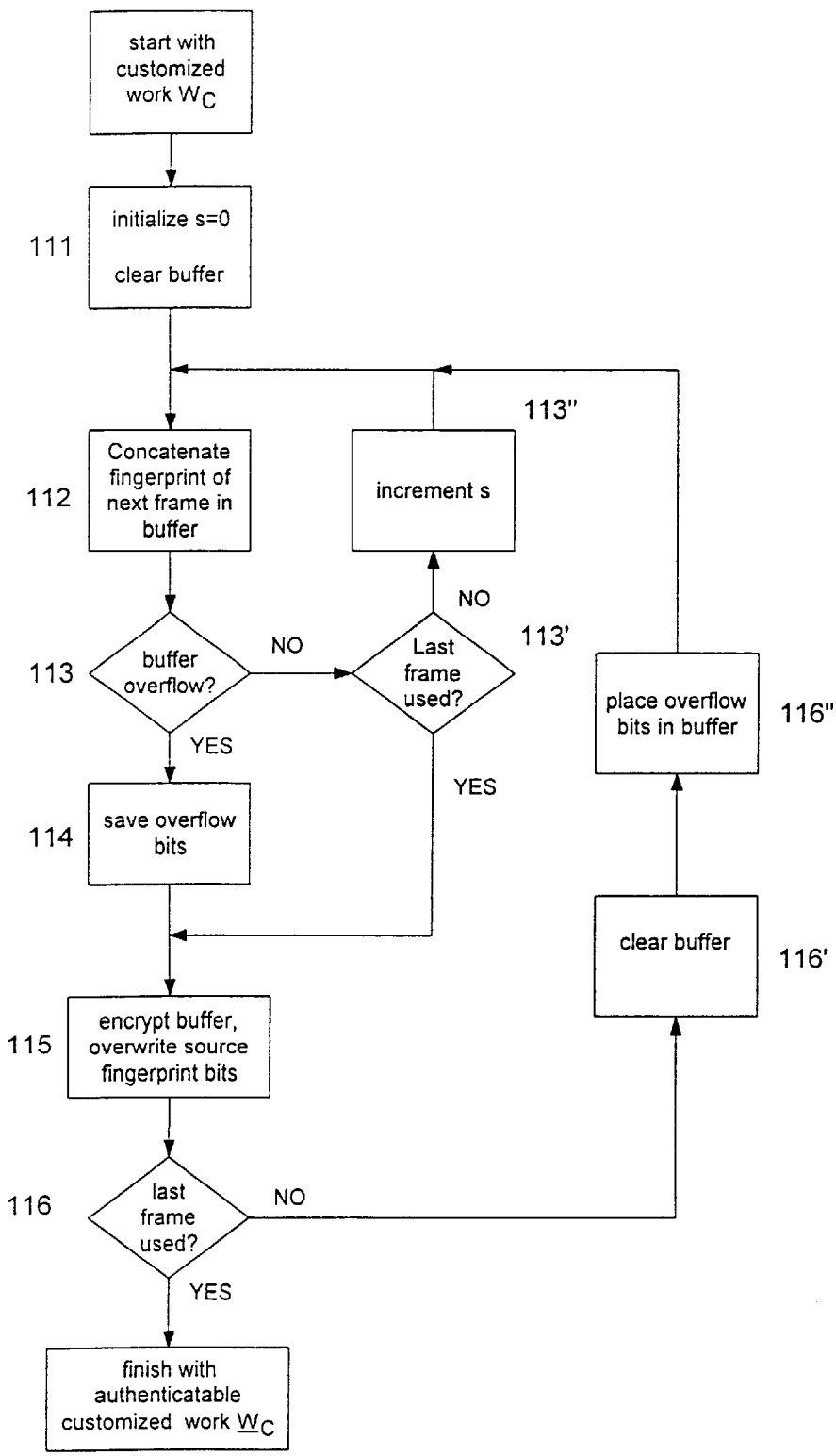
FIG. 11 is a flow-chart diagram that illustrates steps that a content distributor can follow to prepare a customized copy of a digital work for authentication.
Figure 12:
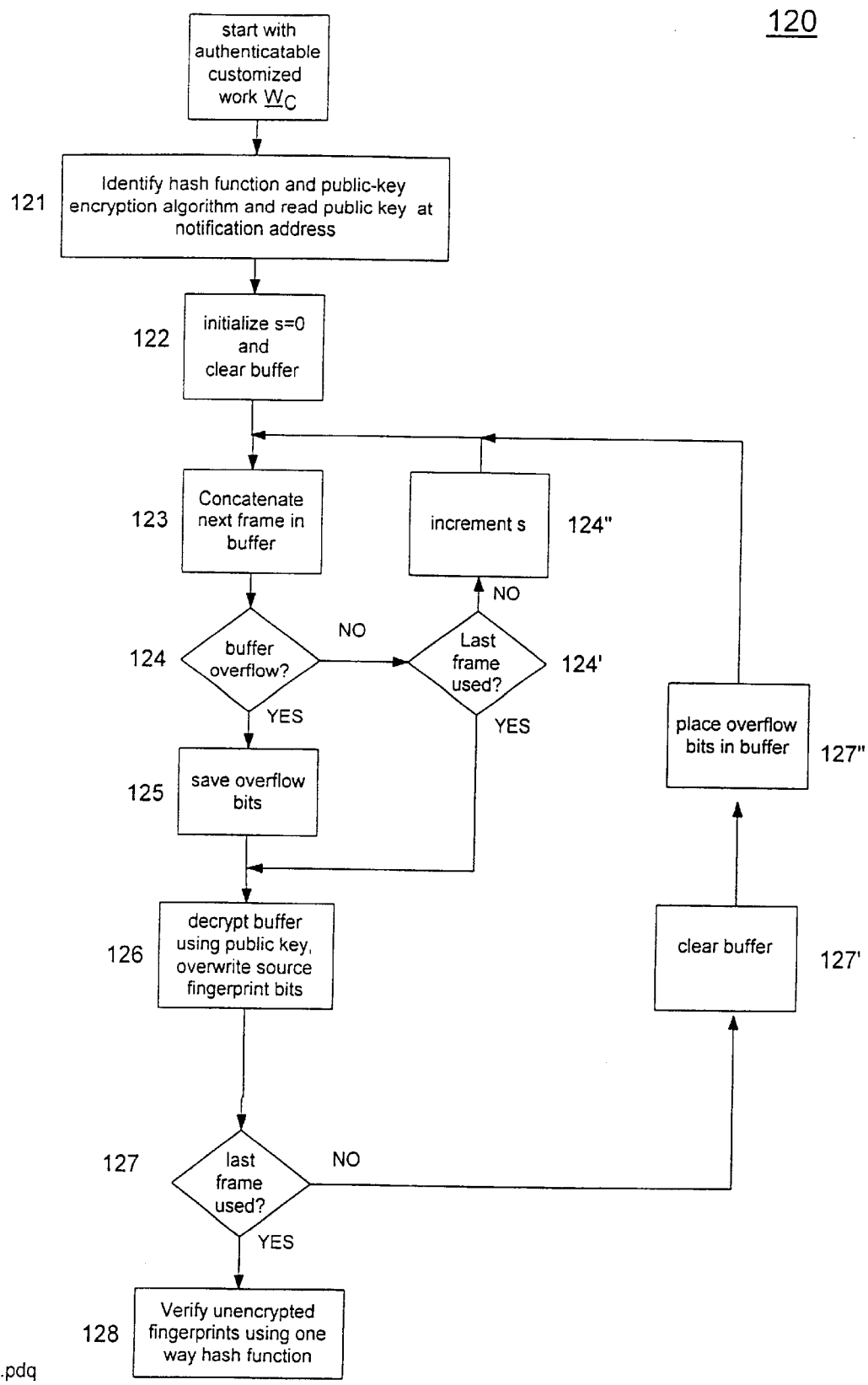
FIG. 12 is a flow-chart diagram that illustrates steps that anyone can follow to authenticate a customized copy of a digital work if it is prepared according to the method of FIG. 11.
Figure 13:
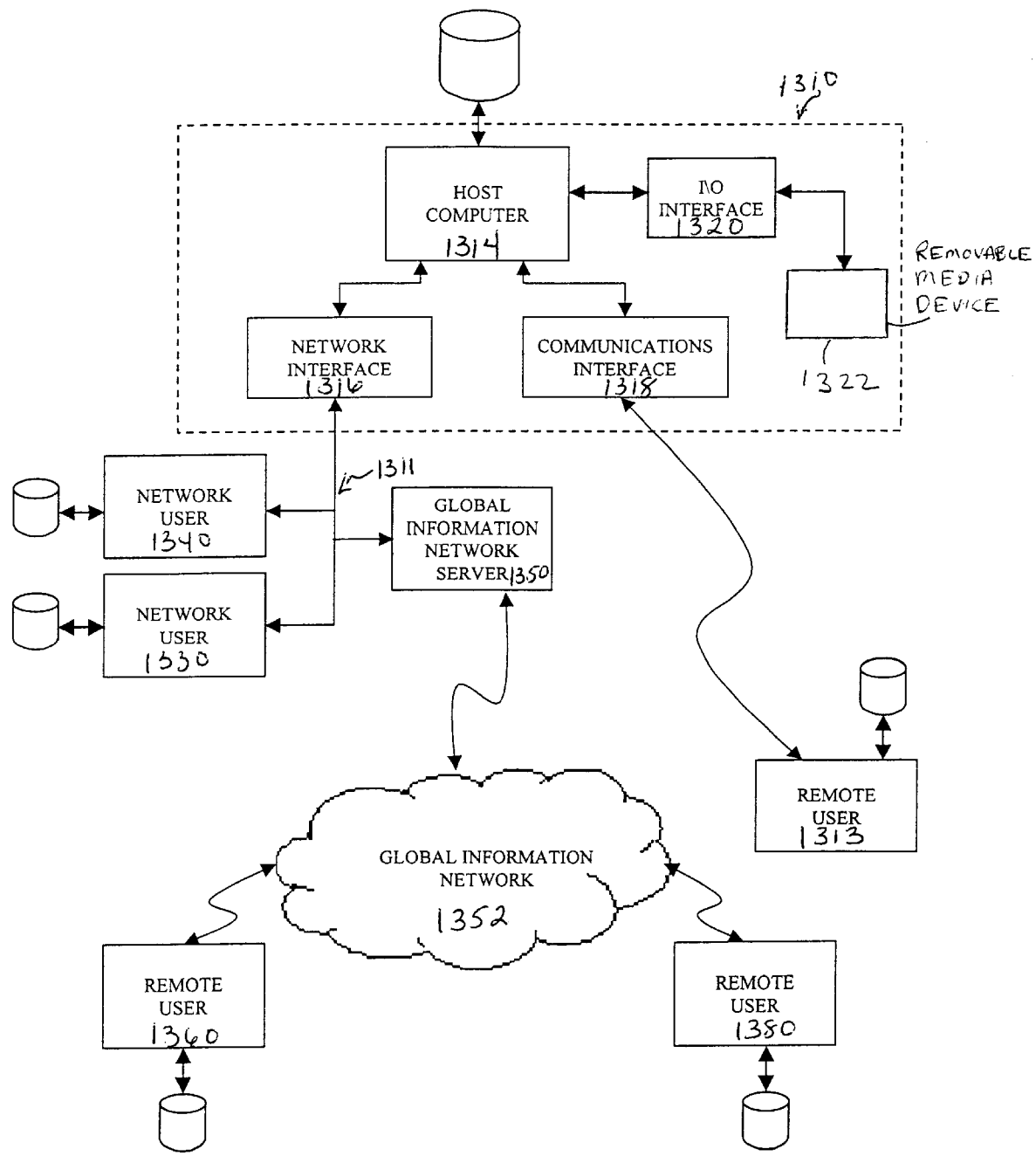
FIG. 13 is a block diagram of an exemplary physical implementation of any of the data-processing methods shown in FIGS. 1–12.

FIG. 11 shows steps comprising an exemplary method (110) by which frame fingerprints (32) can be encrypted. The process starts with a customized copy $W_C$ of a digital work as developed at the completion of the method (40) shown in FIG. 4. At step 111, the frame sequence number s (63) is reset to 0 and a buffer that has a capacity of m bits is cleared. At step 112, a fingerprint comprising f bits is retrieved from the sth frame of the customized work $W_C$ and concatenated with whatever bits are already in the buffer. At step 113, it is determined if the buffer has overflowed. If the buffer has not overflowed, then at step 113' it is determined whether the fingerprint of the last frame in the work has been used. If the end of the work was not reached, then at step 113" the frame number s is incremented by 1 and the method continues at step 112 again. If the buffer overflowed at step 113, then the extra fingerprint bits are temporarily saved at step 114. Then, at step 115, the buffer is encrypted and the m encrypted bits are used to overwrite the m unencrypted bits in the frames from which the bits were taken. At step 116, another test of the frame number is made. If there are still frames that have not been accessed, the method branches to step 116', where the buffer is cleared. Then at step 116", the overflow bits are placed back in the buffer, and the method returns to step 112 again. If the last frame was used and this was detected at step 113', the method branches to step 115. In this case a partially-filled buffer is encrypted. (This process of combining a submessage with zeroes to form a longer message is sometimes referred to as padding.) When the last frame has been used, and this condition is registered at step 116, the method is complete, and the customized work $W_C$ has been transformed into an authenticatable customized work $\underline{W}_C$. FIG. 12 shows a method (120) to determine the authenticity of a customized work $\underline{W}_C$ in which the fingerprint information has been encrypted by the method (110) of FIG. 11. At step 121, the selections of the one-way hash function and public-key algorithm in use are retrieved at the notification address (101) along with the public key PBK (59, 106) that was used. Steps 122–127 are the same as steps 111–116 of FIG. 11 except that at step 126 the buffer is decrypted using the public key PBK. Finally, at step 128, the fingerprints of all the frames are back in the clear and can be verified by computing the hash of the corresponding application data, frame by frame, using the one-way hash function identified by HID (56, 104). Thus, the tampering of copies of customized digital works that have been rendered authenticatable by the process (110) shown in FIG. 11, can be detected. Persons who pass pirate copies that have been tampered with on to other persons can, therefore, be held responsible. Exact copies will not be detected this way, but the enforcement data will be readable in such copies, and the licensee can be held responsible for them. FIG. 13 is a block diagram of an exemplary physical implementation of any of the data-processing methods shown in FIGS. 1 through 12. The exemplary processing system 1310 includes a host computer 1314 and a network interface 1316 by which the host computer 1314 may communicate with other data-processing systems via a local-area network, a wide-area network or a global information network. As shown in FIG. 13, the host computer 1314 communicates with the network users 1340 and 1330 via a local-area network (LAN) 1311. Computer 1314 also uses the LAN 1311 to communicate with a global information-network server 1350 and, through the server 1350 and global information network 1352, to remote users 1360 and 1380.

In addition to the network interface, the host computer 1314 of the data-processing system 1310 includes a communications interface 1318, for example, a modem, through which the processing system 1310 may communicate with the remote user 1313. The processing system 1310 also includes an input/output (I/O) processor 1320 which is coupled to a removable media device 1321, for example a CD-R drive, through which the host computer can communicate with any other computer system or CD player that does not have a direct or indirect data communication path with the host computer 1314.

Each host computer may contain one or more processors (not shown), memory (not shown), input and output devices (not shown), and access to mass storage (not shown). Each processing system may be a single system or a network of computers, as currently known in the art. The customized digital work can be distributed on writable media 1322, such as a read/write optical disc. The customized work can also be distributed over a computer network such as LAN 1311 or across a global information network 1352 such as the Internet. The host computer 1314 and the global information network 1352 may also communicate with a plurality of remote users 1360 and 1380.

It is contemplated that the subject invention may be practiced in computer software executed by multiple parties. This computer software may be implemented on a carrier, such as a diskette, CD-ROM, DVD-ROM or radio frequency or audio frequency carrier wave.

While the invention has been described by reference to specific embodiments, this was for purposes of illustration only. Numerous alternative embodiments will be apparent to those skilled in the art and are considered to be within the scope of the invention.

The invention claimed is:

1. A method for preparing an authorized copy of digital content to render an unauthorized recording of said content traceable to the authorized copy, the method comprising the steps of:
   (a) preparing first and second versions of the digital content, each of the first and second versions including a respective plurality of data objects, each data object of the first version being artistically equivalent to a corresponding object of the second version but digitally distinct from the corresponding object of the second version;
   (b) generating enforcement data for the authorized copy;
   (c) combining the plurality of objects to form the authorized copy, by selecting a complete set of component objects from respective corresponding objects in the first and second versions responsive to the enforcement data.

2. A method according to claim 1 wherein the enforcement data includes a plurality of binary bits, each bit corresponding to a respectively different one of the plurality of corresponding data objects, and the step of combining the plurality of objects to form the authorized copy includes the step of selecting the corresponding object from the first version if the respective bit of the enforcement data has a value of zero and selecting the corresponding object from the second version if the respective bit of the enforcement data has a value of one.

3. A method of tracing a copy of digital content to an authorized copy, said authorized copy prepared according to the method of claim 2, said method of tracing comprising the steps of:
   comparing a plurality of data objects of the copy of digital content to respective data objects of first and second versions of the digital content from which the authorized copy was prepared to determine respective bits of enforcement data associated with the copy of digital content; and
   comparing the enforcement data associated with the copy of digital content to the enforcement data associated with the authorized copy to trace the copy of digital content to the authorized copy.

4. A method according to claim 3 further comprising the step of masking at least one data object of the copy of digital content prior to the step of comparing the plurality of data objects of the copy of digital content to respective data objects of the first and second versions of the digital content to determine the respective bit of the enforcement data associated with the copy of digital content such that the at least one masked object is not compared.

5. A method according to claim 1 wherein the method is performed responsive to a customer request and the enforcement data associates the digital content with the customer.

6. A method according to claim 5 further comprising the steps of:
   determining a customer identifier corresponding to the customer request and saving the customer identifier in an order database; and
   associating the enforcement data with the customer identifier and saving the enforcement data in the order database.

7. A method according to claim 2 further including the step of
   generating, for the plurality of data objects in each of the first and second versions of the digital content, respective identifying values, the identifying values being formed from the respective data objects such that the respective identifying values of corresponding objects are distinct; and
   storing each identifying value with its respective data object.

8. A method according to claim 7 wherein the identifying values are generated by applying a one-way hash function to the respective data objects.

9. A method of tracing a copy of digital content to an authorized copy, said authorized copy prepared according to the method of claim 7, said method of tracing comprising the steps of:
   generating respective identifying values for a plurality of data objects of the copy of digital content;
   comparing each respective identifying value of the copy of digital content to respective identifying values of the first and second version of the digital content to determine a respective bit of enforcement data associated with the copy of digital content,
   comparing respective bits of the enforcement data associated with the copy of digital content to the enforcement data associated with the authorized copy.

10. A method according to claim 7 wherein each of the identifying values is an n-bit binary value, where n is an integer, and the method further comprises the steps of:
    concatenating a plurality of the n-bit identifying values to form an m-bit value, where m is an integer greater than n;
    encoding the m-bit value to form an m-bit encoded value; and
    replacing each of the plurality of n-bit identifying values in the respective data objects with a respective n-bits of the encoded m-bit value.

11. A method of authenticating a copy of digital content, said copy prepared according to the method of claim 10, said method of authenticating comprising the steps of:
    concatenating n-bits from each of a plurality of data objects in the copy of digital content to form the encoded m-bit value;
    decoding the encoded m-bit value to form a decoded m-bit value;
    generating respective n-bit identifying values for each of a plurality of data objects of respective first and second versions of the digital content;
    concatenating the generated n-bit identifying values to form a generated m-bit value; and
    comparing the decoded m-bit value to the generated m-bit value to authenticate the copy of the digital content.

12. A method according to claim 11 wherein the identifying values are generated by applying a one-way hash function to each of the plurality of data objects of the first and second versions of the digital content and to each of the data objects of the copy of digital content.

13. A carrier containing instructions to cause a general-purpose computer to perform a method of authenticating a copy of digital content, said copy being prepared according to the method of claim 10, said method of authenticating comprising the steps of:
    concatenating n-bits from each of a plurality of data objects in the copy of digital content to form the encoded m-bit value;
    decoding the encoded m-bit value to form a decoded m-bit value;
    generating respective n-bit identifying values for each of a plurality of data objects of respective first and second versions of the digital content;
    concatenating the generated n-bit identifying values to form a generated m-bit value; and
    comparing the decoded m-bit value to the generated m-bit value to authenticate the copy of the digital content.

14. A carrier according to claim 13, further including instructions which cause the computer to generate the identifying values by applying a one-way hash function to each of the plurality of data objects in the first and second versions of the digital content and to the plurality of data objects in the copy of digital content.

15. A carrier containing a set of instructions for causing a general-purpose computer to perform a method of tracing a copy of digital content to an authorized copy, said authorized copy being prepared according to the method of claim 7, said method of tracing comprising the steps of:
    generating respective identifying values for a plurality of data objects of the copy of digital content;
    comparing each respective identifying value of the copy of digital content to the respective identifying value of the first and second versions of the digital content to determine a respective bit of enforcement data associated with the copy of digital content,
    comparing respective bits of the enforcement data associated with the copy of digital content to the enforcement data associated with an authorized copy.

16. A carrier containing a set of instructions for causing a general-purpose computer to perform the method of tracing a copy of digital content to an authorized copy, said authorized copy being prepared according to the method of claim 2, said method of tracing comprising the steps of:
    comparing a plurality of data objects of the copy of digital content to respective data objects of first and second versions of the digital content from which the authorized copy was prepared to determine respective bits of enforcement data associated with the copy of digital content; and
    comparing the enforcement data associated with the copy of digital content to the enforcement data associated with the authorized copy to trace the copy of digital content to the authorized copy.

17. A carrier according to claim 16 further comprising instructions to cause a general-purpose computer to perform the step of masking at least one data object of the copy of digital content prior to the instructions which cause the computer to compare the plurality of data objects of the copy of digital content to the respective data objects of the first and second versions of the digital content to determine the respective bit of the enforcement data associated with the copy of digital content such that the at least one masked object is not compared.

18. A computer system for preparing digital content to render an unauthorized recording of said content traceable to an authorized copy, the system comprising:
   means for preparing first and second versions of the digital content, each of the first and second versions including a respective plurality of data objects, each data object of the first version being artistically equivalent to a corresponding object of the second version but digitally distinct from the corresponding object of the second version;
   means for generating enforcement data for the authorized copy;
   means for combining the plurality of objects to form the authorized copy, by selecting a complete set of component objects from respective corresponding objects in the first and second versions responsive to the enforcement data.

19. A system according to claim 18 wherein:
   the enforcement data includes a plurality of binary bits, each bit corresponding to a respectively different one of the plurality of corresponding data objects; and
   the means for combining the plurality of objects to form the authorized copy includes means for selecting the corresponding object from the first version if the respective bit of the enforcement data has a value of zero and for selecting the corresponding object from the second version if the respective bit of the enforcement data has a value of one.

20. A system for tracing a copy of digital content to an authorized copy, said authorized copy prepared by the system of claim 14, said system comprising:
   means for comparing a plurality of data objects of the copy of digital content to respective data objects of first and second versions of the digital content from which the authorized copy was prepared to determine respective bits of enforcement data associated with the copy of digital content; and
   means for comparing the enforcement data associated with the copy of digital content to the enforcement data associated with the authorized copy to trace the copy of digital content to the authorized copy.

21. A system according to claim 20 further comprising:
   means for masking a data object of the copy of digital content such that the masked objects are not compared by the means for comparing.

22. A system according to claim 19 further comprising:
   means for generating respective identifying values for the plurality of data objects in each of the first and second versions of the digital content, the identifying values being formed from the respective data objects such that the identifying values of corresponding objects are distinct; and
   means for storing each identifying value with its respective data object.

23. A system according to claim 22 wherein each of the identifying values is an n-bit binary value, where n is an integer, and the system further comprises:
   means for concatenating a plurality of the identifying values to form an m-bit value, where m is an integer greater than n;
   means for encoding the m-bit value to form an m-bit encoded value; and
   means for replacing each of the plurality of n-bit identifying values in the respective data objects with a respective n-bits of the encoded m-bit value.

24. A system according to claim 22 wherein the identifying values are generated by applying a one-way hash function to each data object of the first and second versions of the digital content.

25. A carrier containing a set of instructions for causing a general-purpose computer network to perform a method for preparing an authorized copy of digital content to render an unauthorized recording of said content traceable to the authorized copy, the method comprising the steps of:
   (a) preparing first hand second versions of the digital content, each of the first and second versions including a respective plurality of data objects, each data object of the first version being artistically equivalent to a corresponding object of the second version but digitally distinct from the corresponding object of the second version;
   (b) generating enforcement data for the authorized copy;
   (c) combining the plurality of objects to form the authorized copy, by selecting a complete set of component objects from respective corresponding objects in the first and second versions responsive to the enforcement data.

26. A carrier according to claim 25 wherein the set of instructions causes the computer to generate the enforcement data including a plurality of binary bits, each bit corresponding to a respectively different one of the plurality of corresponding data objects, and, in the step of combining the plurality of objects to form the authorized copy, causes the computer to select the corresponding object from the first version if the respective binary bit of the enforcement data has a value of zero and to select the corresponding object from the second version if the respective bit of the enforcement data has a value of one.

27. A carrier according to claim 26 further comprising instructions to cause the computer to perform the steps of:
   generating respective identifying values for a plurality of data objects in each of the first and second versions of the digital content, the identifying values being formed from the data objects such that the respective identifying values of corresponding objects are distinct; and
   storing each identifying value with its respective data object.

28. A carrier containing a set of instructions according to claim 26 wherein each of the identifying values is an n-bit binary value, where n is an integer, and the carrier further comprises instructions which cause the computer to perform the steps of:
   concatenating a plurality of the identifying values to form an m-bit value, where m is an integer greater than n;
   encoding the m-bit value to form an m-bit encoded value; and
   replacing each of the plurality of n-bit identifying values in the respective data objects with a respective n-bits of the encoded m-bit value.

29. A carrier according to claim 26 further including instructions which cause the computer to generate the identifying values by applying a one-way hash function to each data object of the first and second versions of the digital content.

* * * * *